United States Patent [19]

Bonye

[11] Patent Number: 4,701,789
[45] Date of Patent: Oct. 20, 1987

[54] CATHODE RAY TUBE

[75] Inventor: Gordon R. Bonye, Kent, England

[73] Assignee: Rank Electronic Tubes Limited, England

[21] Appl. No.: 838,371

[22] Filed: Mar. 11, 1986

[30] Foreign Application Priority Data

Mar. 13, 1985 [GB] United Kingdom ............... 8506547
Mar. 29, 1985 [GB] United Kingdom ............... 8508318

[51] Int. Cl.$^4$ ..................... H04N 9/18; H04N 9/20
[52] U.S. Cl. ..................... 358/65; 313/475; 313/472
[58] Field of Search ............... 358/65, 64, 66; 313/475, 472

[56] References Cited

U.S. PATENT DOCUMENTS

| | | | |
|---|---|---|---|
| 2,979,632 | 4/1961 | MacNeille | 313/475 |
| 2,983,835 | 5/1961 | Frey, Jr. | 313/475 |
| 3,244,921 | 4/1966 | Behun | 313/475 X |
| 3,247,756 | 4/1966 | Siegmund | 313/475 X |
| 3,439,207 | 4/1969 | Barten | 358/65 X |
| 3,745,398 | 7/1973 | Oikawa | 313/472 |
| 3,812,394 | 5/1974 | Kaplan | 313/472 X |
| 3,826,944 | 7/1974 | Cooper | 313/475 X |
| 3,904,912 | 9/1975 | Duistermaat | 313/472 X |
| 3,988,777 | 10/1976 | Hosokoshi et al. | 358/65 |

Primary Examiner—Michael A. Masinick
Assistant Examiner—E. Anne Toth
Attorney, Agent, or Firm—Lerner, David, Littenberg, Krumholz & Mentlik

[57] ABSTRACT

A color cathode ray tube has a fibre optic faceplate with a uniform phosphor layer on the inside and color elements on the outside, which may be color filters or color phosphors responsive to light from the inside phosphor layer. With this arrangement, the tube may be rugged and alignment problems as between the shadow mask and color elements are eliminated since the color element may be formed after the tube has been permanently assembled, the formation of the color elements being achieved utilizing light generated by the inside phosphor layer in response to irradiation thereof by the electron beams. The shadow mask is arranged so that the zones of the inside phosphor layer irradiated by the scanning electron beams each have an area which covers the ends of a plurality of the optical fibres.

14 Claims, 5 Drawing Figures

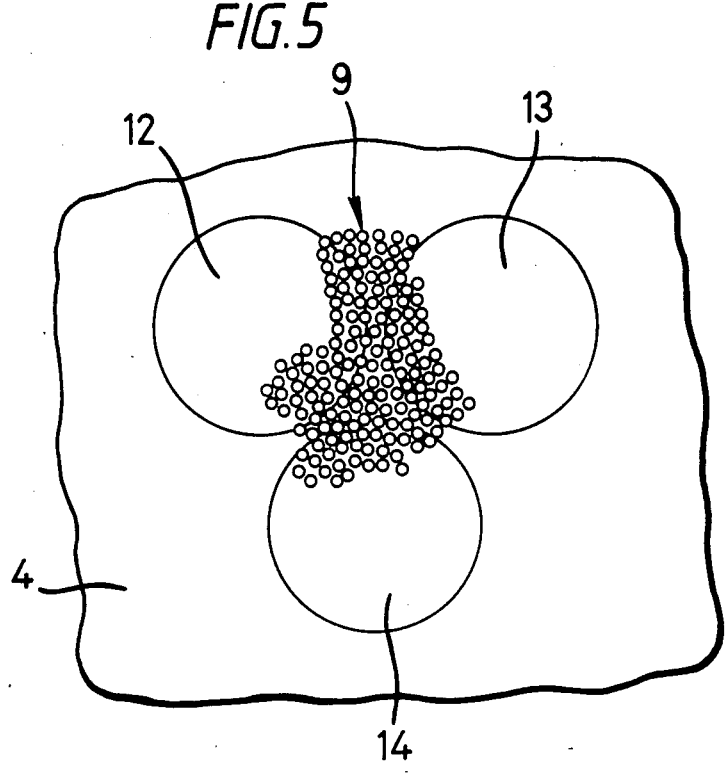

CATHODE RAY TUBE

The present invention relates to a colour cathode ray tube (CRT) and to a method of making a colour CRT.

Conventional shadow mask colour CRTs consist of a shadow mask and an array of phosphor screen dots or lines formed on a glass faceplate, assembled in a vacuum-tight envelope made of metal, glass or ceramic in which there is an electron gun which can provide a plurality of independent electron beams (typically 3).

Each electron beam is aligned with the phosphor dots or lines on the screen which, when irradiated by the electron beam through a shadow mask hole or slit will emit one colour. The rear surface of the phosphor array is normally made electrically conductive by an evaporated layer of aluminium, thus the shadow mask CRT will provide a multicolour picture by the simultaneous modulation of the electron beams while scanning the screen area.

Such colour CRTs have been known for many decades and yet a number of important problems associated with them have remained unsolved.

In particular, the formation of the colour phosphor dots or stripes on the inside of the faceplate of the conventional colour CRT has required that the shadow mask should be kinematically mounted to enable its repeated assembly and disassembly so that the colour phosphors can be formed by a photographic process in which light is shone through the shadow mask onto photoresist/phosphor material provided on the inside surface of the faceplate. As a result, it is difficult to maintain accurate registry between the electron guns, the shadow mask and the arrays of phosphor dots or lines. In order to accommodate such alignment errors, it has been necessary in the prior art to limit the size of the openings in the shadow mask to ensure that the electron beams can only impinge upon their corresponding coloured phosphors and this limitation has resulted in a restriction on the brightness attainable with the tube. In addition, the resolution obtainable with the conventional tube has been limited by the need to ensure that the spacings between the apertures in the shadow mask are sufficiently large that misalignment does not arise. Further, due to these problems extreme difficulty is encountered in attempting to construct a colour CRT of particularly small size such as a tube having a faceplate of 1 inch to 2 inch diameter or diagonal as is required in a number of specific applications.

Structural problems also arise from the manner of mounting the shadow mask. As already indicated, in the conventional tube it is necessary that it be removable and remountable for the purpose of forming the phosphor dots or stripes. As a consequence of this, the conventional tube suffers from a lack of resistance to environmental vibration and shook since such effects can cause the shadow mask to be displaced as a result of which misalignment arises. Any such misalignment, whether due to environmental vibration or shock or due to manufacturing errors, is, furthermore, difficult to correct in the conventional tube.

The object of the present invention is to alleviate these problems.

In one aspect, the invention provides a colour cathode ray tube of the type employing a shadow mask, in which a fibre optic faceplate is employed, a uniform layer of phosphor is provided on the inside of the faceplate for activation through the shadow mask by respective scanning electron beams, and colour element arrays, such as colour filters, are provided on the outside of the faceplate for providing the required coloured light in response to light from the phosphor layer inside the faceplate. The colour elements may be formed, after assembly of the tube, by a photographic method utilizing light from the phosphor layer inside the tube created by irradiation thereof by the scanning electron beams so that the colour element arrays outside the faceplate are formed in correct alignment with the shadow mask and respective scanning electron beams.

In its particularly preferred form, the colour cathode ray tube of the present invention comprises an evacuated envelope having a faceplate comprised by a multiplicity of closely packed optical fibres extending from the inside to the outside thereof; a uniform layer of phosphor inside said faceplate and adapted to emit light in a selected band; a shadow mask positioned inside the envelope adjacent said faceplate and having apertures therein; electron beam generating means adapted to generate a plurality of electron beams originating from spaced apart positions such that different arrays of zones on said phosphor layer may be irradiated through said shadow mask with respective different ones of said beams, each said zone having an area defined by a said shadow mask aperture and by a said corresponding beam which covers the ends of a plurality of said optical fibres; scanning means for causing said beams to scan said phosphor layer in line scan and frame directions; and a plurality of arrays of colour elements outside said faceplate located at positions corresponding respectively to the positions of said different arrays of zones so that each said zone is connected to its corresponding said colour element by the optical fibres covered by said zone, each colour element being adapted to provide light upon the transmission of light thereto through said optical fibres from the corresponding zone of said phosphor layer, the colour elements of the same colour element array being adapted to provide light of the same colour, and the different colour element arrays being adapted to provide light of different colours. In this way, the above discussed problems in conventional colour CRTs are solved. The shadow mask may be permanently fixed in position and does not have to be assembled and disassembled for manufacturing the colour elements and so the tube may be much more rugged than prior art tubes. Also, alignment problems do not arise as between the shadow mask and the colour element array because the colour element array may be formed after the shadow mask has been permanently fixed into position utilizing light from the internal phosphor layer created by irradiation thereof at the precise locations at which the respective electron beams impinge upon that layer; and the colour elements are consequently formed precisely at the required positions. In view of the lack of alignment problems, more closely spaced apertures may be provided in the shadow mask thus improving resolution; and larger apertures may be provided in the shadow mask thus improving brightness. Further, it is possible to make small size colour cathode ray tubes, such as those having a 1 inch or 2 inch faceplate, without difficulty in view of the manner in which the colour elements may be formed precisely in their correct positions after assembly of the tube itself.

The invention is applicable both to tubes having a shadow mask with circular holes in it, in which case the colour elements would be in the form of dots and tubes having shadow masks with slots. In the latter case, the colour elements may be in the form of strips. In both cases, the zones of the inside phosphor layer irradiated through the apertures in the shadow mask during scanning of the electron beams cover the ends of a plurality of the optical fibres as previously indicated. Thus, the relative dimensions of the diameters of the optical fibres, the sizes of the apertures in the shadow mask and the positioning of the shadow mask and the electron beam generating means in the assembly are all chosen to ensure that this is achieved. As a consequence, it is unnecessary to provide for precise alignment between each shadow mask aperture and any particular optical fibre of the fibre optic faceplate so that the tube can be assembled without any difficulty. This applies regardless of the type of shadow mask employed. It can be understood, on the other hand, that if an attempt were made to provide a one to one or approximately one to one relationship between the zones of phosphor irradiated through the shadow mask and the optical fibres, it would be necessary to provide precise alignment between the apertures in the shadow mask and the fibres to avoid image distortion. It is believed that it would not be possible to achieve this, particularly bearing in mind that in these circumstances the size of the apertures would have to be commensurate with the size of the diameter of the fibres and both shadow mask and fibre optic array would have to be free of distortion. If correct alignment were not achieved, it will be readily appreciated that adjacent fibres would transmit light from the phosphor layer in response to activation thereof by only a single one of the beams corresponding to a single colour but the result would be that adjacent colour elements of different colour on the outside of the faceplate would be active, thus producing a wrongly coloured image.

Applicants acknowledge the disclosure in U.S. Pat. No. 3,267,283 (Kapany), U.S. Pat. No. 3,863,093 (Orthuber) and U.S. Pat. No. 4,374,325 (Howorth), the latter corresponding to UK Pat. No. 2,054,311, of image intensifiers for producing colour images with the aid of a fibre optic plate having a phosphor layer on the inside and an array of colour filters on the outside. However, these documents fail to suggest any means for solving the problems which arises in shadow mask colour CTRs and to which the present invention is directed.

Particular embodiments of the present invention will now be described, by way of example, with reference to the accompanying schematic drawings in which:

FIG. 5 is a diagrammatic view on an enlarged scale of a portion of the faceplate.

Figure 1:
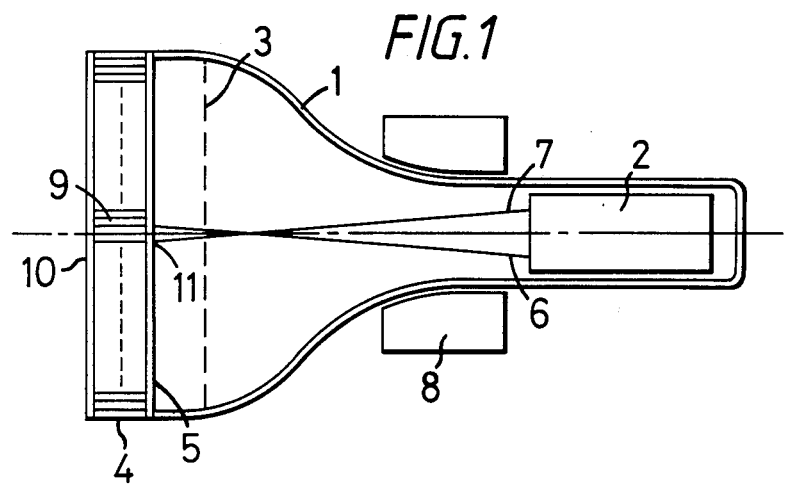
FIG. 1 is a side cross-sectional view of a colour CRT according to the present invention.

FIG. 1 shows a two colour CRT in which a glass vacuum-tight envelope 1 incorporates an electron gun 2. A shadow mask 3 is mounted close to a fibre optic faceplate 4, upon which is deposited a single layer 5 of white emitting phosphor, with the appropriate electrically conductive coating which is normally applied, such as aluminium. The electron gun 2 emits two electron beams 6 and 7 as shown in FIG. 1. The beams 6 and 7 can be deflected by deflection coil 8 and passed through the shadow mask 3 to irradiate the appropriate spots on the phosphor screen 5.

The faceplate 4 comprises a multitude of optical fibres 9 arranged orthogonally to the plane of the faceplate 4. Colour filters (not shown in FIG. 1) are positioned on the outer surface 10 of the faceplate 4. These filters need to be positioned so that the appropriate colour light is transmitted through the outer surface 10 of the faceplate 4 in response to each of the electron beams (6, 7) impinging on the inner surface 11 of the faceplate 4. The colour filters are arranged in the form of two interspersed arrays, each array comprising filters of a single colour. The colours employed may be two of for example red, green and blue. Corresponding to each hole in the shadow mask 3 are two filters, one from each array.

Figure 2:
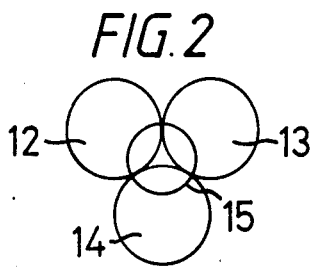
FIGS. 2-4 illustrate alternative arrangements of groups of colour filters on the faceplate of a 3-colour CRT.
Figure 3:
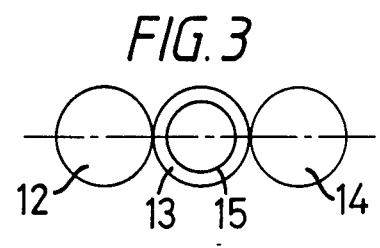
Figure 4:
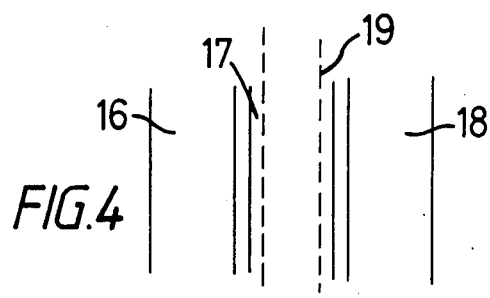

Referring to FIGS. 2-4, these show alternative arrangements for groups of filters in a three colour CRT. A group comprising a red filter 12, a green filter 13 and a blue filter 14 can be arranged in a "delta" configuration as shown in FIG. 2 or may be arranged in a row as shown in FIG. 3. The corresponding hole 15 of the shadow mask 3 is also indicated in FIGS. 2 and 3. FIG. 4 illustrates a different type of arrangement in which the red, green and blue filters 16, 17 and 18 are in the form of strips. In this case, a shadow mask formed with vertical slits would be used. The corresponding vertical slit 19 of such a shadow mask is indicated in FIG. 4.

Reference numerals 12, 13 and 14 in each of FIGS. 2 and 3 may also be taken to represent the zones of the phosphor layer on the inner surface 11 irradiated by the respective electron beams through the apertures in the shadow mask 3. The size and location of these zones is defined by the apertures in the shadow mask, the positioning of the shadow mask in the assembly and the electron beams themselves. As shown in FIG. 5, each of these zones has a diameter relative to the diameter of the optical fibres 9 which is such that each zone completely covers the ends of a plurality of the optical fibres 9. FIG. 5 illustrates only a small number of the fibres present. Thus, each of the irradiated zones is connected to its corresponding colour filter element, which is of similar size, by a multiplicity of optical fibres. This arrangement avoids the need for any precise alignment between individual optical fibres and the apertures in the shadow mask, as previously discussed. Furthermore, it avoids any problems due to Moire patterns as the periodicity of the colour filters is different from that of the optical fibres.

The number of optical fibres covered by each irradiated zone may vary according to the design of tube. The following numeral examples are given by way of illustration.

EXAMPLE 1

Electron Beam Spot Size: 2,000 microns
Shadow Mask Hole Diameter: 540 microns
Shadow Mask Period: 1,200 microns
Irradiated Zone Diameter: 670 microns
Optical Fibre Diameter: 10–50 microns
Number of Fibres Covered by Irradiated Zone: 150–4,000

This would be a relatively low resolution tube.

EXAMPLE 2

Electron Beam Spot Size: 600 microns
Shadow Mask Hole Diameter: 180 microns
Shadow Mask Period: 400 microns
Irradiated Zone Diameter: 220 microns
Optical Fibre Diameter: 10–12 microns Number of Fibres Covered by Irradiated Zone: 400
This would be a tube of fairly standard resolution.

EXAMPLE 3

Electron Beam Spot Size: 300 microns
Shadow Mask Hole Diameter: 90 microns
Shadow Mask Period: 200 microns
Irradiated Zone Diameter: 110 microns
Optical Fibre Diameter: 6 microns
Number of Fibres Covered by Irradiated Zone: 300
This would be a high resolution tube.

EXAMPLE 4

Electron Beam Spot Size: 25 microns
Shadow Mask Hole Diameter: 8 microns
Shadow Mask Period: 21 microns
Irradiated Zone Diameter: 10 microns
Optical Fibre Diameter: 3–4 microns
Number of Fibres Covered by Irradiated Zone: 9

This would be a particularly high resolution tube and these parameters are suitable for small tubes having a faceplate diameter or diagonal of 1–2 inches, which are not normally manufacturable using the conventional colour CRT structure.

In the above Examples, the number of fibres covered is approximate. It is preferred that at least four fibre ends should be covered by each zone and particularly preferred that not less than seven fibres ends should be covered.

It may be noted that, as shown in FIG. 5, there is a small spacing between each of the filters 12, 13 and 14 and the optical fibres 9 disposed in these spaces are not used.

In the case of the embodiment shown in FIG. 4, in which the shadow mask has slots extending in the frame scan direction and the colour filters are in the form of stripes parallel to the slots, the zones irradiated by the beams as defined by the slots in the shadow mask are no longer of circular shape but they are still of a sufficiently large area to cover the ends of a plurality of optical fibres. The number of fibres covered by these zones should be similar to the figures given above in connection with FIGS. 2, 3 and 5. Thus, the width of the shadow mask slots should be such that the dimension of each zone in the line scan direction should be at least twice the diameter of the optical fibres but preferably substantially more. The width of the colour filter strips is equal to the width of the irradiated zones of the inside phosphor as measured in the line scan direction in the FIG. 4 embodiment. In the embodiment of FIGS. 2, 3 and 5, the diameter of the colour filter elements is equal to the diameter of the zones irradiated on the inside phosphor.

A fibre optic faceplate 4 which has extra mural absorption may be used, thus limiting the spread of light from the fibre into other surrounding fibres.

During use light emitted from the parts of the phosphor layer 5 struck by a scanning electron beam travels along the adjacent groups of optical fibres 9 and passes through the filters positioned adjacent the ends of the respective groups of optical fibres 9 so that light emerging from the faceplate 4 and through the filters will acquire the appropriate colour. Thus, for example, light emitted in response to impingement of the electron beams 6 on the white emitting phosphor layer 5 may always pass through filters and light emitted from beam 7 may always pass through green filters.

While the example chosen to illustrate the principle of operation is with two electron beams relating to two different colour arrays, the invention is also suitable for any reasonable number of electron beams and colours which can be fitted into the CRT, with a reasonable matching colour element array and shadow mask.

Processes for making a colour CRT faceplate having a multitude of colour elements on its outer face will now be described.

In one method pigmented, transparent, light-sensitive photoresist is used and the following steps are involved:

(i) The pigmented photoresist material, for example red dyed photoresist, is applied to the outer surface of the faceplate 4, for example, by spinning in a centrifuge, so that a thin layer of the photoresist covers the outer surface 10 of the faceplate 4. Photo-resist is used which hardens on exposure to light or actinic radiation.

(ii) The faceplate 4 is then scanned through the shadow mask 3 by the electron beam which is to control the red content on the screen. Thereby, light from the points in the white phosphor layer 5 which are struck by the scanning beam is transmitted via the optical fibres 9 to the front surface 10 of the faceplate 4 and causes polymerisation of the red dyed photoresist at corresponding locations on the outer surface 10 of the faceplate 4.

(iii) The photoresist is then developed and washed so that hardened, red dots remain on the outer surface 10 of the faceplate 4 forming red filters for the appropriate bundles of the optical fibres 9.

Another layer of pigmented photoresist material is then coated onto the outer surface 10 of the faceplate 4 over the red filter array, for example, green dyed photoresist, and the procedure is repeated except that this time it is the electron beam which is to be responsible for the green content on the screen which is used to scan the faceplate 4 through the shadow mask 3. Consequently, after development and washing of the green dyed photoresist material, green dots forming green filters for the appropriate bundles of the optical fibres 9 remain on the outer surface of the faceplate 4 interspersed with the red filter array.

The corresponding procedure is also carried out for the formation of blue filters on the faceplate if required.

An opaque or black matrix may then be formed on the outer surface of the faceplate 4 so as to fill the spaces between the filters with opaque material if required. This matrix may alternatively be formed before the application of colour filters.

It is also envisaged that photoresist material sensitive to Ultra-Violet (U.V) for example polyvinylalcohol, may be used. In the case of polyvinylalcohol, U.V light having a wavelength in the range 355–380 nm is required for polymerisation to occur. To provide the required U.V light it is envisaged to include U.V emitting phosphors in the screen of the CRT. There are several possible phosphors which may be used as follows:

(a) P4 (silicate type) which is a white phosphor formed from a mixture of zinc sulphide activated by silver, and zinc cadmium sulphide activated by silver. This material emits a broad band of white light covering the whole visible range and extending to a wavelength of 300 nm in the U.V range;

(b) P18 may also be used as the white phosphor layer. P18 is a mixture of calcium magnesium silicate activated by titanium and calcium beryllium silicate activated by manganese; P18 also emits a broad band of white light covering the whole visible range and extending to a wavelength of 300 nm in the U.V range;

(c) P45 which is a single component material, namely yttrium oxysulphide activated by terbium. P45 emits white light covering the whole visible spectrum plus a U.V component;

(d) a portion of ZRP28 or UVC 155E as made by Derby Luminescents Limited of Enfield, Middlesex, England, which are special U.V emitting phosphors, can be incorporated in a white phosphor layer.

In this way, the U.V sensitive photoresist is polymerised when the phosphor screen is irradiated by an electron beam as U.V light will be transmitted to the outer surface 10 of the faceplate 4 by the optical fibres 9.

It should be understood that any suitable method employing photoresist material may be used and that the foregoing method is simply described by way of example.

Alternatively, a photographic method may be used for forming the colour filters on the faceplate 4.

One possible method is to mount an unexposed colour film adjacent the outer surface of the fibre optic faceplate 4 leaving a space for a colour filter to be inserted between the film and the faceplate 4. The method can then be carried out as follows:

a colour filter, for example, a red filter, is placed between the colour film and the faceplate 4;

the faceplate 4 is then scanned, through the shadow mask 3 with the electron beam responsible for the red content on the screen so that light is transmitted through the optical fibres 9 and through the red filter onto the colour film in positions corresponding to where the electron beam hits the white phosphor layer 5;

the red filter is then removed and replaced with a green filter;

the faceplate 4 is then scanned, through the shadow mask 3 using the electron beam responsible for the green content on the screen so that light passes through the optical fibres 9 and through the green filter onto the colour film at positions corresponding to where the electron beam strikes the white phosphor screen;

the green filter is then replaced by a blue filter and the procedure repeated by scanning with the electron beam responsible for the blue content on the screen.

The colour film is then developed to form a colour transparency which will comprise three interspersed arrays of red, green and blue dots respectively corresponding to the positions where each of the three corresponding electron guns hit the screen 5 through the shadow mask 3.

The colour transparency is then mounted permanently onto the faceplate 4 in accurate registry with the position of the original unexposed film during the exposure process.

This method requires accurate repositioning of the developed film on the faceplate 4 but this is easily achievable by energizing one of the electron beams and aligning the corresponding colour dots with the resulting illuminated spots. The use of an adhesive mounting is envisaged. Also film material which has a very high dimensional stability is required. In this respect, polyester resin film is more suitable than cellulose film.

It should be understood that a method according to the present invention may be carried out using various photographic processes and that the above process is described simply by way of example.

In each case, the formed filter element arrays may be covered with a protective coating according to requirements.

Further variations and modifications are possible within the scope of the invention. For example, if it is desired to further enhance the brightness of the image, it would be possible to incorporate in the colour filter material a fluorescent dye, such as those marketed by the Ciba-Geigy company under the name "RAD-GLOW", which are available in many colours. These dyes would be activated by ultraviolet light from the phosphor inside the faceplate and thus add to the brightness of the coloured light passed by the filters themselves.

As a further alternative, the colour elements, instead of being filters, could be appropriate coloured phosphors, such as P22R, P22B and P22G phosphors, which would be activated by ultraviolet light from the phosphor layer inside the faceplate.

Both the abovementioned fluorescent colour filters and the abovementioned coloured phosphors on the outside of the tube can be formed in the manner previously described by mixing the appropriate materials with a suitable photoresist such as PVA and then carrying out the previously described steps.

Various other modifications may be made within the scope of the invention. For example, although two arrangements of colour dots and irradiated zones have been shown in FIGS. 2 and 3, other arrangements are possible.

I claim:

1. A colour cathode ray tube comprising:
an evacuated envelope having a faceplate comprised by a multiplicity of closely packed optical fibers extending from the inside to the outside thereof;
a uniform layer of phosphor inside said faceplate and adapted to emit light in a selected band;
a shadow mask positioned inside the envelope adjacent said faceplate and having apertures therein;
electron beam generating means adapted to generate a plurality of electron beams originating from spaced apart positions such that different arrays of zones on said phosphor layer may be irradiated through said shadow mask with respective different ones of said beams, each said zone having an area defined by a shadow mask aperture and by a corresponding beam which covers the ends of a plurality of said optical fibres;
scanning means for causing said beams to scan said phosphor layer in line scan and frame scan directions; and
a plurality of arrays of colour elements outside said faceplate located at positions corresponding respectively to the positions of said different arrays of zones so that each said zone is connected to its corresponding said colour element by the optical fibres covered by said zone, each colour element being adapted to provide light upon the transmission of light thereto through said optical fibres from the corresponding zone of said phosphor layer, the colour elements of the same colour element array being adapted to provide light of the same colour, and the different colour element arrays being adapted to provide light of different colours.

2. A colour cathod ray tube according to claim 1, wherein each said zone covers the ends of from 7–100 of said optical fibres.

3. A colour cathode ray tube according to claim 1, wherein each said zone covers the ends of from 100-500 said optical fibres.

4. A colour cathode ray tube according to claim 1, wherein each said zone covers the ends of from 500-4,000 said optical fibers.

5. A colour cathode ray tube according to claim 1, wherein said colour elements are in the form of dots.

6. A colour cathode ray tube according to claim 5, comprising three said colour element arrays, the dots being arranged as triads.

7. A colour cathode ray tube according to claim 6, comprising three said colour element arrays, the dots being arranged in groups, each group comprising a dot from each different colour element array, and the dots in each group being arranged in a line in said line scan direction.

8. A colour cathode ray tube according to claim 5, wherein each dot is spaced from its neighbours.

9. A colour cathode ray tube according to claim 8, wherein the spaces between said dots are black.

10. A colour cathode ray tube according to claim 1, wherein said shadow mask is provided with slots for passing said electron beams, said slots extending in the frame scan direction and said colour elements being in the form of stripes extending parallel to said slots.

11. A colour cathode ray tube according to claim 1, wherein said colour elements are colour filters and said band comprises visible light.

12. A colour cathode ray tube according to claim 11, wherein said colour filters include fluorescent material and said band includes ultraviolet light.

13. A colour cathode ray tube according to claim 1, wherein said colour elements comprise coloured phosphors and said band comprises ultraviolet light.

14. A colour cathode ray tube according to claim 1, wherein the size of said faceplate is not greater than 2 inches.

* * * * *